United States Patent
Sharma

(10) Patent No.: US 11,877,188 B2
(45) Date of Patent: Jan. 16, 2024

(54) IMPLEMENTING A FAULT-TOLERANT MULTI-NRF NETWORK TOPOLOGY

(71) Applicant: Nokia Solutions and Networks Oy, Espoo (FI)

(72) Inventor: Ranjan Sharma, New Albany, OH (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/279,323

(22) PCT Filed: Mar. 24, 2020

(86) PCT No.: PCT/US2020/024406
§ 371 (c)(1),
(2) Date: Mar. 24, 2021

(87) PCT Pub. No.: WO2021/194471
PCT Pub. Date: Sep. 30, 2021

(65) Prior Publication Data
US 2023/0007536 A1    Jan. 5, 2023

(51) Int. Cl.
*H04W 28/08* (2023.01)
*H04W 28/088* (2023.01)
(Continued)

(52) U.S. Cl.
CPC ....... *H04W 28/088* (2023.05); *H04L 61/4511* (2022.05); *H04L 67/1001* (2022.05);
(Continued)

(58) Field of Classification Search
CPC . H04W 28/0842; H04W 24/02; H04W 24/04; H04W 4/10; H04W 40/24;
(Continued)

(56) References Cited

U.S. PATENT DOCUMENTS

2020/0314672 A1* 10/2020 Farooq ............... H04L 43/0817
2021/0258861 A1*  8/2021 Wang ................... H04L 67/51
(Continued)

FOREIGN PATENT DOCUMENTS

CN      104782196 A     7/2015
CN      110679185 A     1/2020
(Continued)

OTHER PUBLICATIONS

China Mobile, Hierarchical NF discovery in iteration mode, 3GPP TSG CT WG4 Meeting #86, C4-186469, 10 pages, Aug. 2018.*
(Continued)

*Primary Examiner* — Frank Duong
(74) *Attorney, Agent, or Firm* — Harness, Dickey & Pierce, P.L.C.

(57) ABSTRACT

A system, apparatus, method, and non-transitory computer readable medium for implementing a fault-tolerant multi-NRF network topology may include a network repository function (NRF) device including: at least one processor configured to execute computer readable instructions to cause the NRF device to, broadcast a NRF query to a NRF cluster of a core network, the NRF cluster including a plurality of NRF devices located in a public land mobile network (PLMN); receive NRF query responses from each NRF device of the NRF cluster, the NRF query responses including network configuration information of each NRF device; determine a status of each NRF device based on the network configuration information; determine a list of network function (NF) devices registered with the NRF cluster; receive a NF query request from a first NF device; and transmit a NF query response to the first NF device.

20 Claims, 7 Drawing Sheets

(51) Int. Cl.
  *H04L 67/51* (2022.01)
  *H04L 61/4511* (2022.01)
  *H04L 67/1001* (2022.01)
  *H04L 67/1097* (2022.01)
  *H04L 67/00* (2022.01)
  *H04L 69/40* (2022.01)

(52) U.S. Cl.
  CPC .......... *H04L 67/1097* (2013.01); *H04L 67/34* (2013.01); *H04L 67/51* (2022.05); *H04L 69/40* (2013.01)

(58) Field of Classification Search
  CPC ............. H04L 61/4511; H04L 67/1001; H04L 67/1097; H04L 67/34; H04L 67/51; H04L 69/40; H04L 41/12; H04L 67/10
  See application file for complete search history.

(56) References Cited

U.S. PATENT DOCUMENTS

2021/0368306 A1* 11/2021 Garcia Azorero .... H04M 15/66
2021/0373931 A1* 12/2021 Engelhart ........... H04L 65/1073
2022/0124162 A1*  4/2022 Zhang .................... H04W 4/50

FOREIGN PATENT DOCUMENTS

WO  WO-2019/119435 A1   6/2019
WO  WO-2019193129 A1   10/2019
WO  WO-2020/038151 A1   2/2020

OTHER PUBLICATIONS

China Mobile, Hierarchical NF discovery in recursion mode, 3GPP TSG CT WG4 Meeting #86 C4-186468, 3 pages, Aug. 2018.*
"3rd Generation Partnership Project; Technical specification group core network and terminals; 5g system; network function repository services; stage 3" 3GPP TS 29.510 V15.3.0 (Mar. 2019) Release 15.
International Preliminary Report on Patentability for corresponding International Application No. PCT/US2020/024406 dated Oct. 6, 2022.
"3rd Generation Partnership Project; Technical Specification Group Core Network and Terminals; 5G System; Network Function Repository Services; Stage 3 (Release 16)", 3GPP TS 29.510, V16.1.1, Oct. 2019, pp. 1-150.
Extended European Search Report received for corresponding European Patent Application No. 21164154.3, dated Jul. 27, 2021, 9 pages.
"Discussion on Hierarchical NF Discovery", 3GPP TSG CT WG4 Meeting #86, C4-186071, Agenda : 7.2.1.8, China Mobile, Aug. 20-24, 2018, 3 pages.
CN Office Action dated Jun. 1, 2023, issued in corresponding Chinese Patent Application No. 202110310188.X.

* cited by examiner

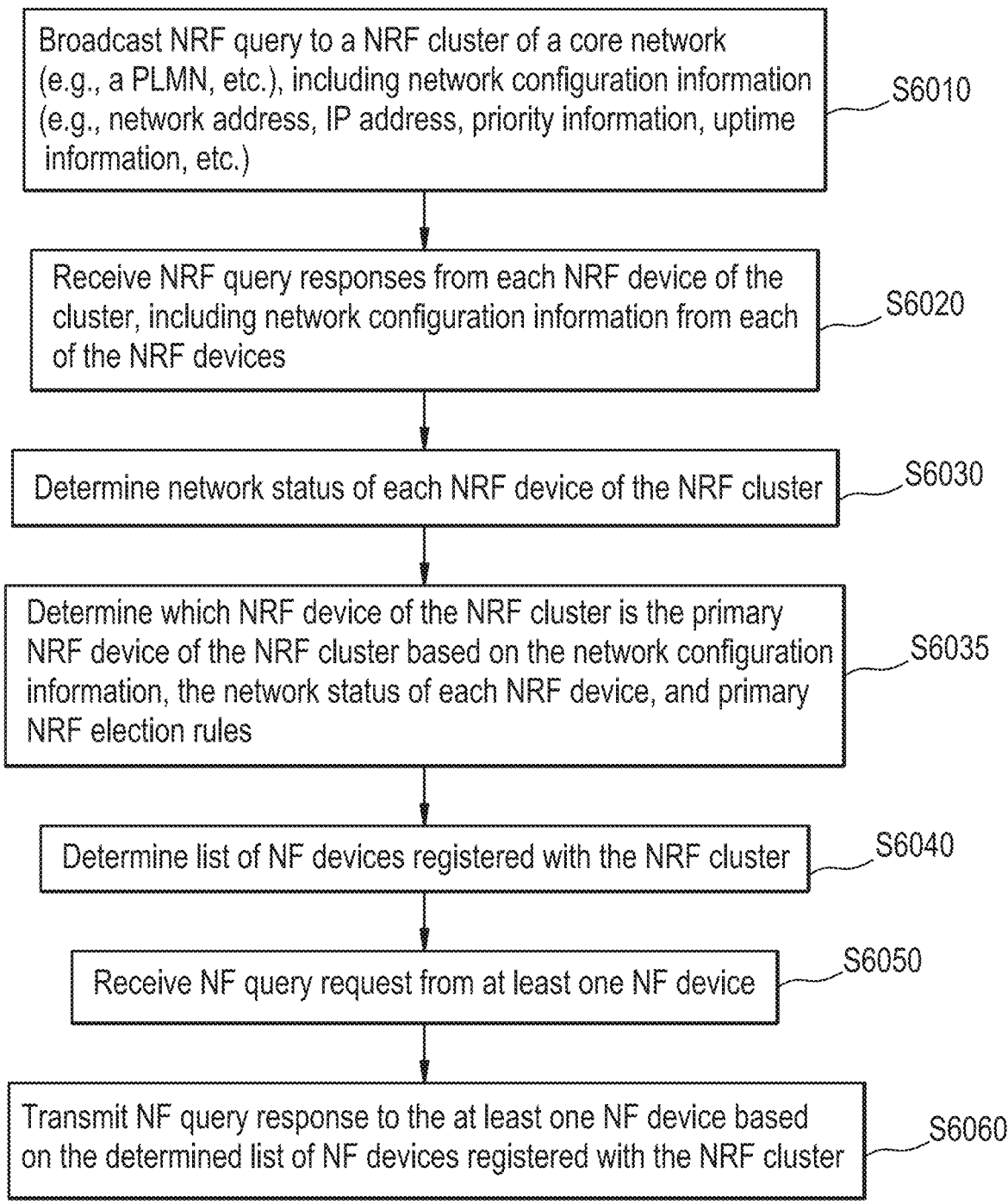

IMPLEMENTING A FAULT-TOLERANT MULTI-NRF NETWORK TOPOLOGY

CROSS-REFERENCE TO RELATED APPLICATIONS

This application is a national phase entry under 35 U.S.C. § 371 of PCT International Application No. PCT/US2020/024406 which has an International filing date of Mar. 24, 2020, the entire contents of which are hereby incorporated by reference.

BACKGROUND

Field

Various example embodiments relate to methods, apparatuses, systems, and/or non-transitory computer readable media for implementing a fault-tolerant multi-NRF network topology for a wireless communication network, such as a public land mobile network (PLMN).

Description of the Related Art

Currently, a $5^{th}$ generation mobile network (5G) standard, referred to as 5G New Radio (NR), is being developed to provide higher capacity, higher reliability, and lower latency communications than the 4G long term evolution (LTE) standard. Under the current 5G standard, a network service provider, such as a cellular telephony provider, deploys a single network repository function (NRF) device to service a single mobile country code (MCC)-mobile network code (MNC) of a public land mobile network (PLMN). The NRF maintains priority, capacity and/or availability information related to network functions (NFs), e.g., network services, network service functions, core network service functions, etc., available on the core network (e.g., a 5G network, etc.), as well as the services supported by the NFs.

However, the current 5G standard does not provide support for multiple and/or redundant NRF devices to operate on the same MCC-MNC of a PLMN. Consequently, the 5G standard does not provide support for load-balancing NF queries and/or write requests among a plurality of NRF devices.

Accordingly, an approach is desired that provides a fault-tolerant multi-NRF network topology for a wireless communication network, including providing redundancy and/or failover support for NRF device(s) and/or NF device(s), as well as load-balancing functionality for NF requests, on the wireless communication network.

SUMMARY

At least one example embodiment relates to a network repository function (NRF) device.

In at least one example embodiment, the NRF device may include a memory storing computer readable instructions, and at least one processor configured to execute the computer readable instructions. The execution of the computer readable instructions by the at least one processor may cause the NRF device to broadcast a NRF query to a NRF cluster of a core network, the NRF cluster including a plurality of NRF devices located in a public land mobile network (PLMN), the NRF query including network configuration information of the NRF device; receive NRF query responses from each NRF device of the NRF cluster, the NRF query responses including network configuration information of each NRF device of the NRF cluster; determine a status of each NRF device of the NRF cluster based on the network configuration information of the plurality of NRF devices, the determining the status including determining which NRF device of the plurality of NRF devices is a primary NRF device of the NRF cluster; determine a list of network function (NF) devices registered with the NRF cluster; receive a NF query request from a first NF device; and transmit a NF query response to the first NF device, the NF query response based on the determined list of NF devices.

Some example embodiments of the NRF device provide that the NRF device is a secondary NRF device of the NRF cluster; and the NRF device is further caused to receive the list of NF devices registered with the NRF cluster from the primary NRF device, and transmit the NF query response to the first NF device based on the received list of NF devices.

Some example embodiments of the NRF device provide that the NRF device is further caused to receive a NF registration request from a second NF device; transmit the NF registration request to the primary NRF device; receive a NF registration response from the primary NRF device; and forward the NF registration response to the second NF device.

Some example embodiments of the NRF device provide that the NRF device is further caused to receive an updated list of the NF devices registered with the NRF cluster from the primary NRF device in response to at least one change in the NF devices registered with the NRF cluster; and receive current subscription information from the primary NRF device, the current subscription information including a list of the NF devices subscribed to the primary NRF device.

Some example embodiments of the NRF device provide that the NRF device is further caused to determine a network status of the primary NRF device of the NRF cluster; and in response to the network status of the primary NRF device indicating the primary NRF device is offline, determine a current primary NRF device from remaining NRF devices of the plurality of NRF devices of the NRF cluster based on the network configuration information of the remaining NRF devices, and receive an updated list of the NF devices registered with the NRF cluster from the current primary NRF device.

Some example embodiments of the NRF device provide that the NRF device is the primary NRF device; and the NRF device is further caused to receive a second NF registration request from a second NF device or from at least one secondary NRF device of the NRF cluster, update the list of the NF devices registered with the NRF cluster based on the received second NF registration request, transmit a second NF registration response to the second NF device or to the at least one secondary NRF device, and transmit the updated list of the NF devices registered with the NRF cluster to the at least one secondary NRF device.

Some example embodiments of the NRF device provide that the NRF device is further caused to broadcast the NRF query request to the NRF cluster to a subnet of the core network assigned to the NRF cluster; and the network configuration information of the NRF cluster includes at least an IP address of each NRF device of the NRF cluster.

At least one example embodiment relates to a network function (NF) device.

In at least one example embodiment, the NF device may include a memory storing computer readable instructions, and at least one processor configured to execute the computer readable instructions. The execution of the computer readable instructions by the at least one processor may cause the NF device to transmit a network address query to a domain name search (DNS) server related to a network repository function (NRF) cluster located in a public land mobile network (PLMN), the NRF cluster including a plurality of NRF devices, the plurality of NRF devices including a primary NRF device and at least one secondary NRF device; receive a DNS response from the DNS server, the DNS response including a list of network address information for each NRF device of the NRF cluster; transmit a NF registration request to at least one NRF device of the NRF cluster based on the list of network address information for the plurality of NRF devices of the NRF cluster; and receive a NF registration response from the at least one NRF device of the NRF cluster.

Some example embodiments of the NF device provide that the NF device is further caused to transmit a NF query request to the at least one NRF device of the NRF cluster; and receive a NF query response from the at least one NRF device of the NRF cluster.

Some example embodiments of the NF device provide that the NF device is a consumer NF device; and the NF device is further caused to communicate with at least one first producer NF device based on the received NF query response from the at least one NRF device of the NRF cluster.

Some example embodiments of the NF device provide that the NF device is further caused to determine whether the at least one first producer NF device is offline; and in response to the at least one first producer NF device being offline, transmit a second NF query request to the at least one NRF device of the NRF cluster, receive a second NF query response from the at least one NRF device of the NRF cluster, and communicate with at least one second producer NF device based on the received second NF query response.

Some example embodiments of the NF device provide that the NF device is further caused to transmit the NF registration request to a first NRF device of the NRF cluster corresponding to a first entry of the list of network address information for the NRF cluster, the list of network address information being a load-balanced list of network address information; and receive the NF registration response from the first NRF device of the NRF cluster.

Some example embodiments of the NF device provide that the NF device is further caused to determine whether the first NRF device is offline; and in response to the first NRF device being offline, transmit a third NF query request to a second NRF device of the NRF cluster corresponding to a second entry of the list of network address information for the NRF cluster, and receive a third NF query response from the second NRF device.

At least one example embodiment relates to a method of operating a NRF device.

In at least one example embodiment, the method may include broadcasting, using at least one processor, a NRF query to a NRF cluster of a core network, the NRF cluster including a plurality of NRF devices located in a public land mobile network (PLMN), the NRF query including network configuration information of the NRF device; receiving, using the at least one processor, NRF query responses from each NRF device of the NRF cluster, the NRF query responses including network configuration information of the plurality of NRF devices; determining, using the at least one processor, a status of each NRF device of the NRF cluster based on the network configuration information of the plurality of NRF devices, the determining the status including determining which NRF device of the plurality of NRF devices is a primary NRF device of the NRF cluster; determining, using the at least one processor, a list of network function (NF) devices registered with the NRF cluster; receiving, using the at least one processor, a NR query request from a first NF device; and transmitting, using the at least one processor, a NR query response to the first NF device, the NR query response based on the determined list of NF devices.

Some example embodiments of the method provide that the NRF device is a secondary NRF device of the NRF cluster; and the method may further include receiving, using the at least one processor, the list of NF devices registered with the NRF cluster from the primary NRF device, and transmitting, using the at least one processor, the NR query response to the first NF device based on the received list of NF devices.

Some example embodiments of the method may further include receiving, using the at least one processor, a NF registration request from a second NF device; transmitting, using the at least one processor, the NF registration request to the primary NRF device; receiving, using the at least one processor, a NF registration response from the primary NRF device; and forwarding, using the at least one processor, the NF registration response to the second NF device.

Some example embodiments of the method may further include receiving, using the at least one processor, an updated list of the NF devices registered with the NRF cluster from the primary NRF device in response to at least one change in the NF devices registered with the NRF cluster; and receiving, using the at least one processor, current subscription information from the primary NRF device, the current subscription information including a list of the NF devices subscribed to the primary NRF device.

Some example embodiments of the method may further include determining, using the least one processor, a network status of the primary NRF device of the NRF cluster; and in response to the network status of the primary NRF device indicating the primary NRF device is offline, determining a current primary NRF device from remaining NRF devices of the plurality of NRF devices of the NRF cluster based on the network configuration information of the remaining NRF devices, and receiving an updated list of the NF devices registered with the NRF cluster from the current primary NRF device.

Some example embodiments of the method may provide that the NRF device is the primary NRF device; and the method may further include receiving, using the at least one processor, a second NF registration request from a second NF device or from at least one secondary NRF device of the NRF cluster, updating, using the at least one processor, the list of the NF devices registered with the NRF cluster based on the received second NF registration request, transmitting, using the at least one processor, a second NF registration response to the second NF device or to the at least one secondary NRF device, and transmitting, using the at least one processor, the updated list of the NF devices registered with the NRF cluster to the at least one secondary NRF device.

Some example embodiments of the method may provide that the broadcasting the NRF query request to the NRF cluster further includes transmitting the broadcast message to a subnet of the core network assigned to the NRF cluster; and the network configuration information includes at least an IP address of each NRF device of the NRF cluster.

At least one example embodiment relates to a NRF device.

In at least one example embodiment, the NRF device may include means for broadcasting a NRF query to a NRF cluster of a core network, the NRF cluster including a plurality of NRF devices located in a public land mobile network (PLMN), the NRF query including network configuration information of the NRF device; receiving NRF query responses from each NRF device of the NRF cluster, the NRF query responses including network configuration information of each NRF device of the NRF cluster; determining a status of each NRF device of the NRF cluster based on the network configuration information of the plurality of NRF devices, the determining the status including determining which NRF device of the plurality of NRF devices is a primary NRF device of the NRF cluster; determining a list of network function (NF) devices registered with the NRF cluster; receiving a NF query request from a first NF device; and transmitting a NF query response to the first NF device, the NF query response based on the determined list of NF devices.

Some example embodiments of the NRF device provide that the NRF device is a secondary NRF device of the NRF cluster; and further include means for receiving the list of NF devices registered with the NRF cluster from the primary NRF device, and transmitting the NF query response to the first NF device based on the received list of NF devices.

Some example embodiments of the NRF device further include means for receiving a NF registration request from a second NF device; transmitting the NF registration request to the primary NRF device; receiving a NF registration response from the primary NRF device; and forwarding the NF registration response to the second NF device.

Some example embodiments of the NRF device further include means for receiving an updated list of the NF devices registered with the NRF cluster from the primary NRF device in response to at least one change in the NF devices registered with the NRF cluster; and receiving current subscription information from the primary NRF device, the current subscription information including a list of the NF devices subscribed to the primary NRF device.

Some example embodiments of the NRF device further include means for determining a network status of the primary NRF device of the NRF cluster; and in response to the network status of the primary NRF device indicating the primary NRF device is offline, determining a current primary NRF device from remaining NRF devices of the plurality of NRF devices of the NRF cluster based on the network configuration information of the remaining NRF devices, and receiving an updated list of the NF devices registered with the NRF cluster from the current primary NRF device.

Some example embodiments of the NRF device provide that the NRF device is the primary NRF device; and the NRF device further include means for receiving a second NF registration request from a second NF device or from at least one secondary NRF device of the NRF cluster, updating the list of the NF devices registered with the NRF cluster based on the received second NF registration request, transmitting a second NF registration response to the second NF device or to the at least one secondary NRF device, and transmitting the updated list of the NF devices registered with the NRF cluster to the at least one secondary NRF device.

Some example embodiments of the NRF device further include means for broadcasting the NRF query request to the NRF cluster to a subnet of the core network assigned to the NRF cluster; and the network configuration information of the NRF cluster includes at least an IP address of each NRF device of the NRF cluster.

At least one example embodiment relates to a network function (NF) device.

In at least one example embodiment, the NF device may include means for transmitting a network address query to a domain name search (DNS) server related to a network repository function (NRF) cluster located in a public land mobile network (PLMN), the NRF cluster including a plurality of NRF devices, the plurality of NRF devices including a primary NRF device and at least one secondary NRF device; receiving a DNS response from the DNS server, the DNS response including a list of network address information for each NRF device of the NRF cluster; transmitting a NF registration request to at least one NRF device of the NRF cluster based on the list of network address information for the plurality of NRF devices of the NRF cluster; and receiving a NF registration response from the at least one NRF device of the NRF cluster.

Some example embodiments of the NF device further include means for transmitting a NF query request to the at least one NRF device of the NRF cluster; and receiving a NF query response from the at least one NRF device of the NRF cluster.

Some example embodiments of the NF device provide that the NF device is a consumer NF device; and the NF device further include means for communicating with at least one first producer NF device based on the received NF query response from the at least one NRF device of the NRF cluster.

Some example embodiments of the NF device further include means for determining whether the at least one first producer NF device is offline; and in response to the at least one first producer NF device being offline, transmitting a second NF query request to the at least one NRF device of the NRF cluster, receiving a second NF query response from the at least one NRF device of the NRF cluster, and communicating with at least one second producer NF device based on the received second NF query response.

Some example embodiments of the NF device further include means for transmitting the NF registration request to a first NRF device of the NRF cluster corresponding to a first entry of the list of network address information for the NRF cluster, the list of network address information being a load-balanced list of network address information; and receiving the NF registration response from the first NRF device of the NRF cluster.

Some example embodiments of the NF device further include means for determining whether the first NRF device is offline; and in response to the first NRF device being offline, transmitting a third NF query request to a second NRF device of the NRF cluster corresponding to a second entry of the list of network address information for the NRF cluster, and receiving a third NF query response from the second NRF device.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 6 is a flowchart illustrating a method for operating a NRF device according to at least one example embodiment.

DETAILED DESCRIPTION

Figure 1:
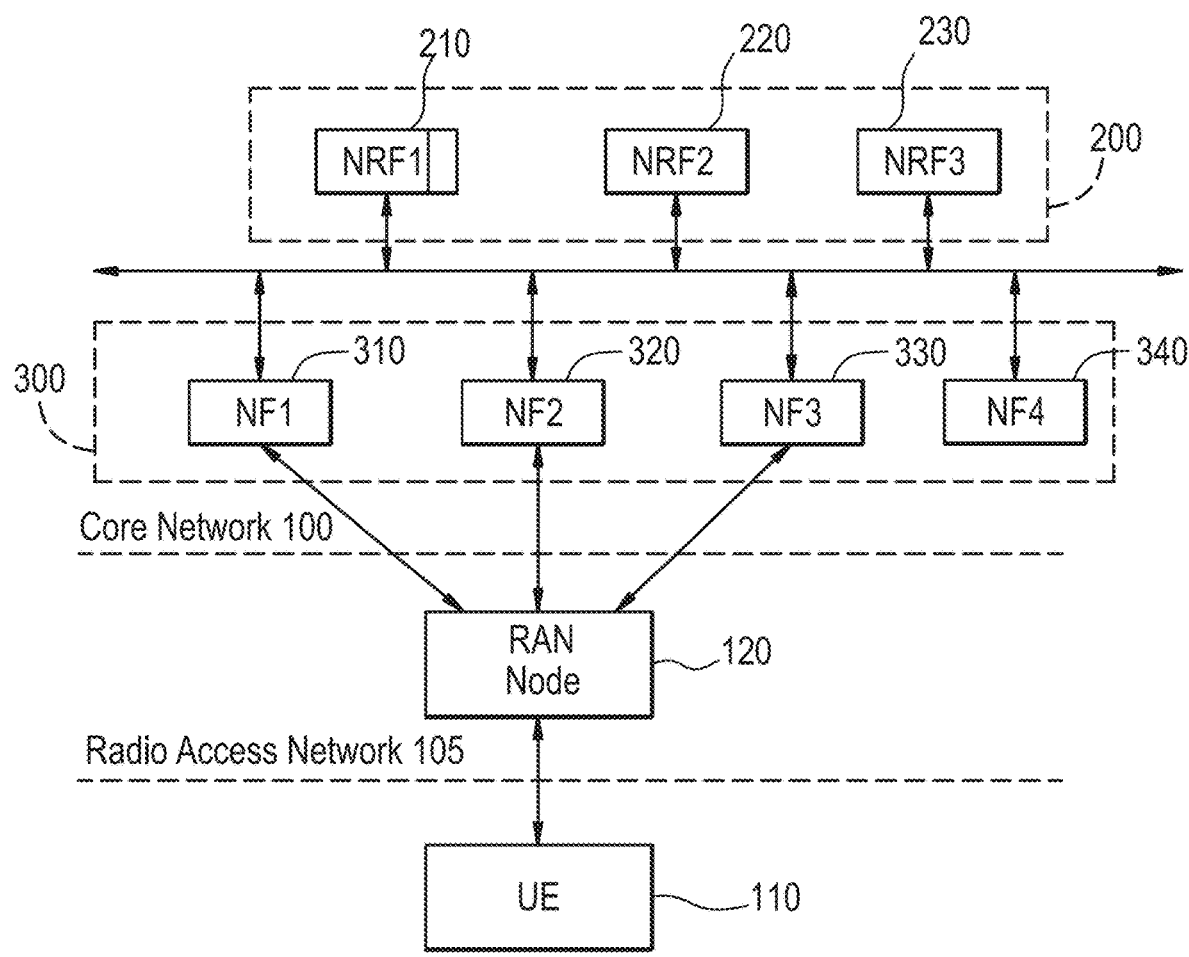
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to implementing a fault-tolerant multi-NRF network topology for one or more regions of a wireless communication network. While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

FIG. 1 illustrates a wireless communication system according to at least one example embodiment. As shown in FIG. 1, a wireless communication system includes at least one user equipment (UE) device (UEs or UE devices) 110, a first RAN node 120, and a plurality of core network servers, including a plurality of network function (NF) devices 300, including NF devices 310, 320, 330, 340, etc., and/or a network repository function (NRF) cluster 200, the NRF cluster 200 including a plurality of NRF devices 210, 220, and 230, etc., but the example embodiments are not limited thereto and the example embodiments may include a greater or lesser number of constituent elements. For example, the wireless communication system may include a plurality of UE devices, a plurality of RAN nodes, a single NF device, a plurality of NF devices greater than 4, a plurality of NRF clusters, a plurality of NRF devices greater than three, and/or a plurality of regions, etc.

The UE 110, the RAN node 120, the plurality of NF devices 300, and/or the NRF cluster 200, may be connected over a wireless network, such as a cellular wireless access network (e.g., a 3G wireless access network, a 4G-Long Term Evolution (LTE) network, a 5G-New Radio (e.g., 5G) wireless network, a 6G network, a 7G network, a WiFi network, etc.). The wireless network may include a core network 100, which may be a MCC-MNC of a PLMN, also referred to as a region, and a radio access network 105, etc. The RAN node 120 may be located in the radio access network (e.g., may be a part of the radio access network, etc.) and may connect to other RAN nodes (not shown), the NRF cluster 200, and/or the plurality of NF devices 300 over a wired and/or wireless network, and the plurality of NRF devices and/or plurality of NF devices may connect to each other over a wired and/or wireless network.

The UE 110 may be any one of, but not limited to, a mobile device, a tablet, a laptop computer, a wearable device, an Internet of Things (IoT) device, a desktop computer and/or any other type of stationary or portable device capable of operating according to the 5G NR communication standard, or other wireless communication standard.

The wireless communication system further includes at least one RAN node (e.g., a base station, a wireless access point, etc.), such as RAN node 120. The RAN node 120 may operate according to an underlying cellular and/or wireless network communications protocol, such as the 5G NR LTE communication protocol, etc. For example, the RAN node 120 may be a 5G gNB node or a LTE ng-eNB node, etc., but the example embodiments are not limited thereto.

The RAN node 120 may be connected to at least one core network element, such as a core network device, a core network server, access points, switches, routers, nodes, etc., but the example embodiments are not limited thereto. The core network server may be a NF device and/or a NRF device, etc. For example, the plurality of NF devices 310, 320, 330, and/or 340, etc., and/or the plurality of NRF devices 210, 220, and/or 230, etc., may be embodied as a core network device. The plurality of NF devices may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system 100, such as access points, switches, routers, nodes, servers, gateways, a Data Network, etc.

Figure 2A:
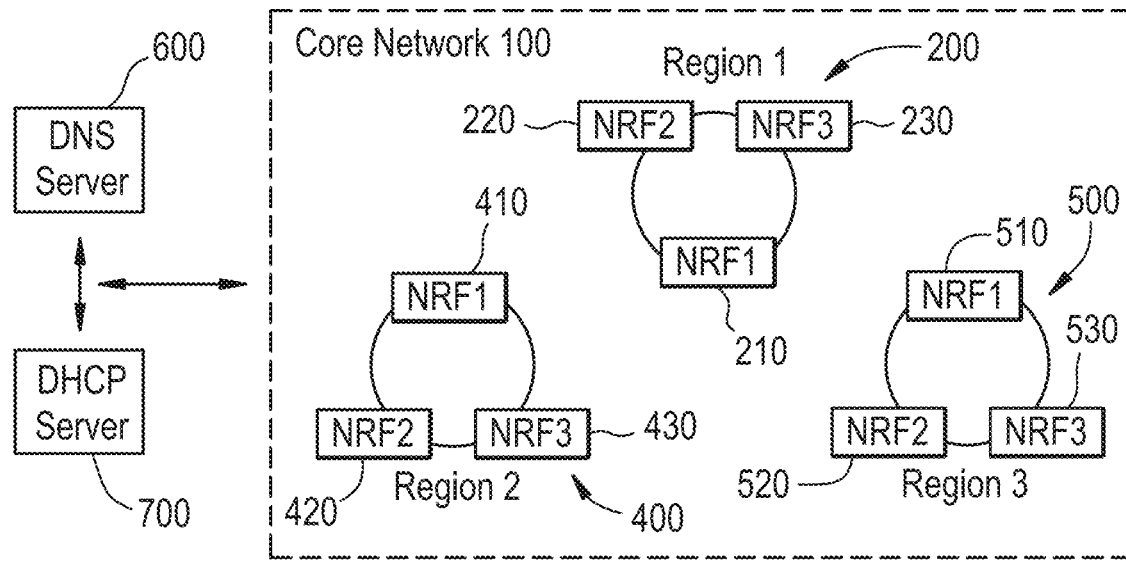
FIG. 2A to 2B illustrate example regions of a mobile network according to some example embodiments.
Figure 2B:
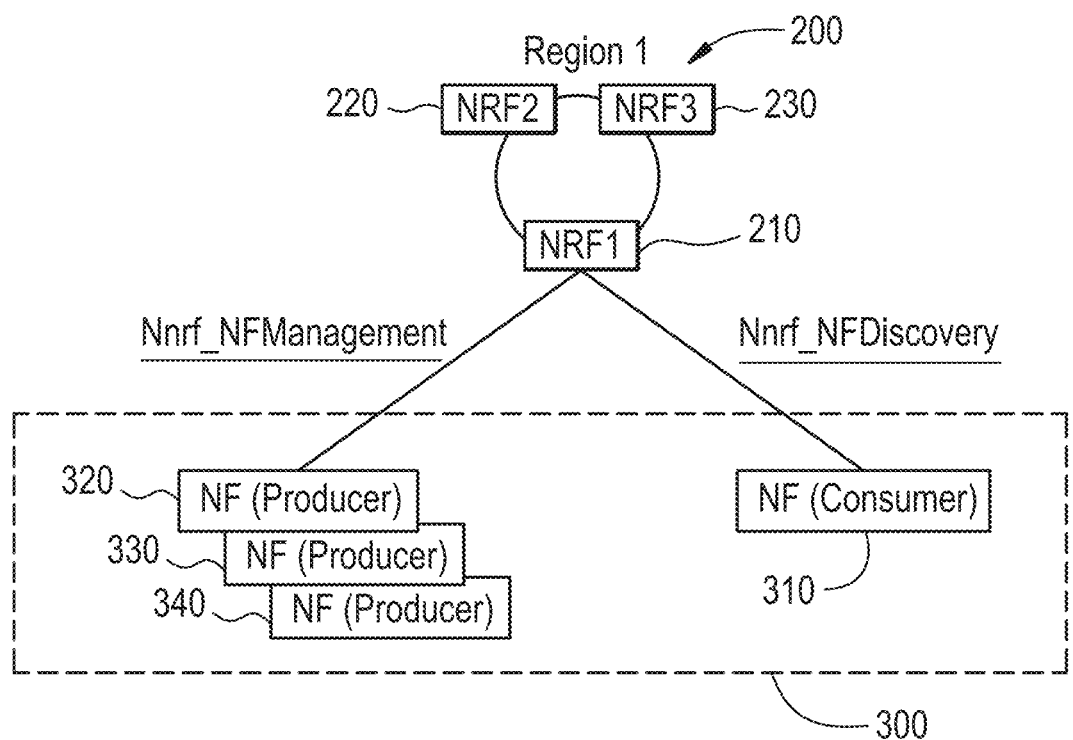

FIG. 2A to 2B illustrate example regions of a mobile network according to some example embodiments.

Referring now to FIG. 2A, according to some example embodiments, a core network 100, such as a MCC-MNC of a PLMN, may include a plurality of regions, such as a first region 200, a second region 400, and/or a third region 500, etc., but the example embodiments are not limited thereto. For example, according to other example embodiments, a MCC-MNC of a PLMN may have a single region, two regions, or may have four or more regions, etc. In each region of the core network 100, there may be a NRF cluster, for example, NRF cluster 200, NRF cluster 400, NRF cluster 500, etc., or in other words, the terms region and cluster may be used interchangeably herein. Each NRF cluster may include a plurality of NRF devices configured to interoperate and/or provide redundant functionality, such as NRF devices 210, 220, and/or 230, etc., in NRF cluster 200; NRF devices 410, 420, and/or 430, etc., in NRF cluster 400; and NRF devices 510, 520, and/or 530, etc., in NRF cluster 500. However, the example embodiments are not limited thereto, and for example, the number of NRF devices in a NRF cluster may be greater or lesser than the numbers shown in FIG. 2A, the number of NRF clusters in a region may be greater or lesser than the numbers shown in FIG. 2A, and/or the number of regions in a wireless network may be greater or lesser than the numbers shown in FIG. 2A. Additionally, according to some example embodiments, the NRF cluster for each region may communicate with other and/or provide redundancy services to other NRF clusters in another region (s), etc.

Referring now to region 1, the NRF cluster 200 may include a plurality of NRF devices, 210, 220, and 230, etc.

At least one of the NRF devices of the NRF cluster 200, such as NRF device 210, may act as a primary NRF device (e.g., a master NRF device, etc.), and the remaining NRF devices, such as NRF devices 220 and 230, etc., may act as secondary NRF devices (e.g., a shadow NRF device, etc.), and the NRF devices of the NRF cluster 200 may provide NRF functionality to at least one external device, such as the plurality of NF devices 300, a UE device, etc. The communication between the NRF cluster 200 and the plurality of NF devices 300 will be discussed in more detail in connection with FIG. 2B.

According to at least one example embodiment, the plurality of NRF devices of the NRF cluster 200 may reside on a designated section of the PLMN network, such as a desired subnet, etc. The NRF cluster 200 itself may be addressed by the external devices, such as NF devices, using a single fully qualified domain name (FQDN) identifier, e.g., URL, IP address, etc., for the NRF cluster via a DNS server 600 connected to the core network 100. However, each of the plurality of NRF devices may be automatically or manually configured with desired unique network configuration information (e.g., network address information, IP address information, etc.) based on the designated section information of the PLMN network, such that each of the NRF devices, such as NRF devices 210, 220, and 230, etc., are individually addressable. For example, a DHCP server 700 connected to the core network 100 may assign the unique network configuration information for each NRF device of the plurality of NRF devices.

Additionally, a primary NRF device may be automatically or manually selected from the plurality of NRF devices of the NRF cluster 200. For example, a network administrator may manually select one of the plurality of NRF devices 210, 220, and 230 to act as the primary NRF device, etc. According to other example embodiments, the primary NRF device may be automatically selected (and/or elected) by the plurality of NRF devices 210, 220, 230, themselves, without the intervention of a human operator. For example, the primary NRF device may be selected by the NRF devices of the NRF cluster 200 themselves based on the network configuration information (such as an octet of their IP address, their full IP address, amount of time online (network "uptime"), etc.) of each of the NRF cluster 200, hardware resources of each of the NRF devices (e.g., processing capabilities, memory capacity, etc.), network resources of each of the NRF devices (e.g., network bandwidth, network throughput, network congestion, etc.), the amount of time the NRF device has been online, the amount of time since the NRF device was rebooted last, the amount of time since the NRF device was last elected as a primary NRF device, the current load balance information of the NRF device, etc., but the example embodiments are not limited thereto.

As an example, when a new NRF device, e.g., NRF device 230, joins, and/or initializes onto, the NRF cluster 200, the NRF device may transmit its own network configuration information, e.g., the IP address, the network uptime information, etc., and/or broadcast an NRF query to all of the NRF devices on the subnet associated with the NRF cluster 200 requesting the network configuration information from all of the NRF devices connected to the subnet of the NRF cluster 200. According to at least one example embodiment, the NRF query request may include the requesting NRF device's own network configuration information as well, or in other example embodiments, the NRF device may transmit its own network configuration information in a separate message, such as a "ping" command, etc., than the NRF query requesting the network configuration information from the other NRF devices on the NRF cluster 200, such as an "arp" command, etc. In response to receiving the NRF query request from NRF device 230, each of the other NRF devices on the NRF cluster subnet, e.g., NRF devices 210 and 220, transmits their own network configuration to the requesting NRF device 230. In at least one example embodiment, the NRF query response messages from NRF devices 210 and 220 may be broadcast to the entire NRF cluster 200 via the subnet, but the example embodiments are not limited thereto.

Based on the network configuration information of all of the NRF devices of the NRF cluster 200 and desired election rules and/or criteria stored in the memories of the NRF devices, the NRF devices may select one of the NRF devices connected to the NRF cluster 200 as the primary NRF device of the NRF cluster 200. For example, the primary NRF device may be elected based on which NRF device has the lowest (or highest) last octet number in their respective IP addresses, may be elected based on which NRF device has been online the longest (e.g., longest uptime, etc.), may be elected based on which NRF device has been rebooted most recently, which NRF device was elected as the primary NRF device most recently, which NRF device has the least amount of workload, etc., however the example embodiments are not limited thereto.

Assuming the NRF devices are electing the primary NRF device based on the lowest last octet rule, the NRF device 230 may compare its own IP address with the IP addresses included in the NRF query responses received from the other NRF devices 210 and 220. If the last octet of the NRF device 230's IP address is lower than the last octet of the IP addresses of NRF device 210 and 220, then it considers itself the primary NRF device of the NRF cluster 200. However, if the last octet of the IP addresses for one or both of the NRF devices of the NRF cluster 200 is lower than the NRF device 230, then the NRF device 230 considers itself a secondary NRF device, and then proceeds to register with the primary NRF device of the NRF cluster 200. Referring to FIG. 2A, it is assumed that NRF device 210 is the primary NRF device of NRF cluster 200. The new NRF device 230, and/or the other secondary NRF device 220, may transmit a request for all current subscription information from the primary NRF device 210 and/or the current NF registration information from the primary NRF device 210, thereby updating its database with current information of the primary NRF device 210.

Additionally, the secondary NRF devices 220 and/or 230 may then provide load-balancing functionality and/or redundancy functionality to the primary NRF device 210. For example, when an NF device, such as NF device 310 transmits a NF query request to the NRF cluster 200, any one of the NRF devices of the NRF cluster 200 may service and/or respond to the NF query request, including the primary NRF device 210, or any one of the secondary NRF devices 220 and 230, etc. Moreover, if the primary NRF device 210 goes offline and/or is otherwise unavailable, either of the secondary NRF devices 220 or 230 may be automatically promoted to act as the primary NRF device of the NRF cluster 200, thereby providing automatic fail-over capabilities to the PLMN 100 and/or the region 200, etc.

The election of the primary NRF device of the NRF cluster 200 may automatically occur after the primary NRF device goes offline, after a new NRF device joins the NRF cluster 200 (e.g., a new NRF device is initialized, etc.), after a previously offline NRF device comes back online (e.g., the offline NRF device recovers, etc.), and/or the election of the primary NRF device may occur due to an network administer command, and/or may occur at desired frequencies (e.g., periodically), etc., thereby adding, improving, and/or increasing the redundancy of the NRF cluster. Further, the election of the primary NRF device may not occur when one or more of the secondary NRF devices goes offline, thereby increasing "uptime" of the NRF cluster itself and decreasing the network resource usage and/or amount of network traffic between any registered NF device and the NRF cluster 200, by allowing NF requests to be handled by any NRF device of the NRF cluster 200.

One or more of the NRF devices of the NRF cluster 200 may transmit a "heartbeat" message to the other NRF devices of the NRF cluster 200 to determine the online/offline status of the NRF devices of the NRF cluster 200. For example, the heartbeat message may be a "ping" and/or "arp" command periodically executed by one or more of the NRF devices. If one or more of the NRF devices fails to respond to a desired number of heartbeat messages (e.g., 1 heartbeat message, 2 heartbeat messages, etc.), the other NRF devices may update their records to indicate that the non-responsive NRF device is offline. For example, secondary NRF devices 220 and 230 may each periodically transmit heartbeat messages to the entire subnet, and if the primary NRF device 210 fails to respond to, for example, two heartbeat messages, the secondary NRF devices 220 and 230 may determine that the primary NRF device 210 is offline and then proceed to perform an election for a new primary NRF device based on the remaining NRF devices of the NRF cluster 200 that are online, etc.

Referring now to FIG. 2B, according to some example embodiments, a NRF cluster 200 may include a plurality of NRF devices 210, 220, and/or 230, etc. Additionally, there may be at least one NF device which communicates with at least one NRF device of the NRF cluster 200. As shown in FIG. 2B, according to at least one example embodiment, there may be a plurality of NF devices 310, 320, 330, and/or 340, etc., communicating with at least one NRF device of the NRF cluster 200, but the example embodiments are not limited thereto. Each of the NF devices may be either a consumer NF device (e.g., NF device 310, etc.), a producer NF device (e.g., NF devices 320, 330, and 340, etc.), or may be both a consumer NF device and a producer NF device. A producer NF device, e.g., a producer NF service, etc., may provide a network service to other NFs, e.g., consumer NFs and/or consumer NF devices, and/or UE devices. For example, policy control function (PCF), access and mobility management function (AMF), and session management function (SMF), may be examples of producer NFs, but the example embodiments are not limited thereto. Further, consumer NFs may subscribe to producer NFs and receive services and/or information from the producer NFs. Examples of consumer NFs include AMF, SMF, PCF, CHF, etc., but the example embodiments are not limited thereto. Additionally, while FIG. 2B illustrates NF devices as being either a consumer NF device, such as consumer NF device 310, or a producer NF device, such as producer NF devices 320, 220, and 340, the example embodiments are not limited thereto, and a NF device may be both a consumer NF device and a producer NF device. For example, a PCF may act as a producer NF for an AMF and SMF on the same PLMN, and the AMF and SMF will act as consumer NFs in this scenario, but the PCF may be a consumer NF of services from a CHF on the same PLMN, etc., but the example embodiments are not limited thereto.

A plurality of NF devices 300 of the PLMN, e.g., individual NF devices 310, 320, 330, and/or 340, etc., may be assigned to a particular region of the PLMN, such as the first region 200, by a DHCP server 700 and/or a network administrator, etc. The plurality of NF devices 300 may communicate with the NRF cluster 200 by first messaging a DNS server 600 over the core network 100 using the FQDN associated with the NRF cluster 200. The DNS server 600 may provide each of the plurality of NF devices 300 with a network configuration list (e.g., a network address list, an IP address list, etc.) associated with the NRF cluster 200, the network configuration list including the network configuration information of each of the NRF devices of the NRF cluster 200, such as the network addresses, IP addresses, etc., of each of the NRF devices.

According to at least one example embodiment, the network configuration list may be an ordered list that implements a load-balancing policy for the NRF cluster 200. In other words, the DNS server 600 may provide a first NF device 310 with a first network configuration ordered list that differs with a second network configuration ordered list provided to a second NF device 320, etc., in order to balance the load on each individual NRF device of the NRF cluster 200. For example, the load-balancing policy may be a round-robin policy (e.g., the sequence of network configuration information included in the ordered list is rotated by one position for each NF device, etc.), a randomized policy (e.g., the sequence of network configuration information included in the ordered list is randomly generated for each NF device), and/or may be generated based on the individual characteristic(s) of the NF device and/or the NRF device(s) (e.g., NF devices located in a certain geographic region may be assigned to NRF devices in the same geographic region, producer NF devices may be assigned to certain NRF devices, consumer NF devices may be assigned to certain NRF devices, etc.), etc., however the example embodiments are not limited thereto.

Each individual NF device may then communicate with the NRF cluster 200 by transmitting messages to the first NRF device included in the ordered list obtained from the DNS server 600. For example, consumer NF device 310 may have received an ordered network configuration list from DNS server 600 listing NRF device 210 first, NRF device 220 second, and NRF device 230 third, and therefore NF device 310 will transmit all of its messages to the NRF device 210 first, and if no response is received from NRF device 210 (e.g., the NRF device 210 is offline, etc.), the NF device 310 will transmit its messages to the next NRF device on the ordered list, NRF device 220, etc.

The communication between individual NF devices of the plurality of NF devices 300 and at least one NRF device of the NRF cluster 200 will be discussed in greater detail in connection with FIGS. 5A and 5B.

Figure 3:
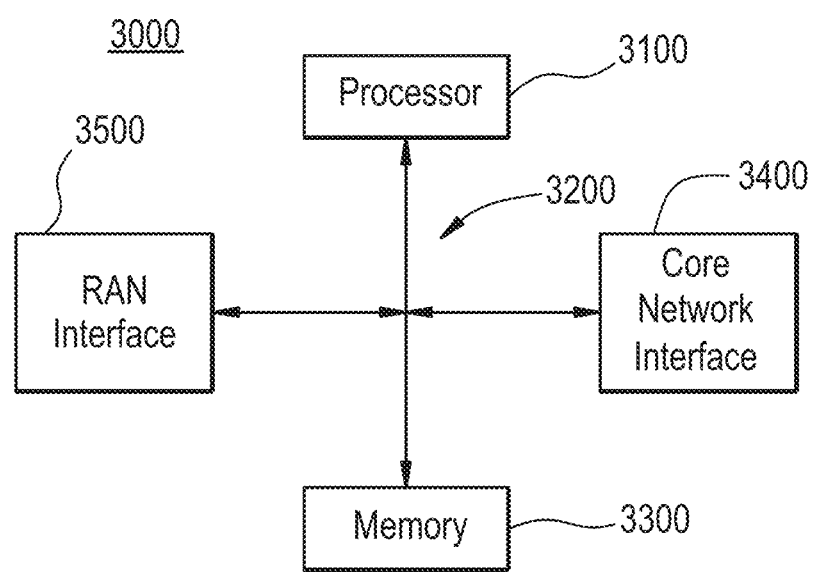
FIG. 3 illustrates a block diagram of an example core network server according to at least one example embodiment.

FIG. 3 illustrates a block diagram of an example core network server according to at least one example embodiment. The core network server may be a NF device, such as NF devices 310, 320, 330, and/or 340 of FIG. 1, a NRF device, such as NRF devices 210, 220, and/or 230 of FIG. 1, and/or a network server, such as DNS server 600 and/or DHCP server 700 of FIG. 2A, but the example embodiments are not limited thereto.

Referring to FIG. 3, a core network server 3000 (e.g., a network device, a network element, etc.) may include processing circuitry, such as the at least one processor 3100, a communication bus 3200, a memory 3300, at least one core network interface 3400, and/or at least one radio access network (RAN) network interface 3500, but the example embodiments are not limited thereto. For example, the core network interface 3400 and the RAN network interface 3500 may be combined into a single network interface, etc. The memory 3300 may include various program code including computer executable instructions.

In at least one example embodiment, the processing circuitry may include at least one processor (and/or processor cores, distributed processors, networked processors, etc.), such as the at least one processor 3100, which may be configured to control one or more elements of the core network server 3000, and thereby cause the core network server 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire core network server 3000. Once the special purpose program instructions are loaded into, (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the core network server 3000, such as the methods discussed in connection with FIGS. 2A and 2B, 4A to 4C and 5A to 5B, the at least one core network interface 3400, and/or at least one RAN network interface 3500, etc. Such software elements may be loaded from a non-transitory computer-readable storage medium independent of the memory 3300, using a drive mechanism (not shown) connected to the core network server 3000, or via the at least one core network interface 3400, and/or at least one RAN network interface 3500, etc.

In at least one example embodiment, the communication bus 3200 may enable communication and data transmission to be performed between elements of the core network server 3000. The bus 3200 may be implemented using a high-speed serial bus, a parallel bus, and/or any other appropriate communication technology.

The core network server 3000 may also include at least one core network interface 3400, and/or at least one RAN network interface 3500, etc. The at least one RAN network interface 3500 may include an associated radio unit (not shown) and may be used to transmit the wireless signals in accordance with a wireless communication protocol, such as 4G LTE wireless signals, 5G NR wireless signals, 6G wireless signals, 7G wireless signals, etc., to at least one RAN node, such as RAN node 120, and/or to at least one UE device, such as UE 110, etc. According to some example embodiments, the RAN network interface 3500 may be a single antenna, or may be a plurality of antennas, etc. In at least one example embodiment, the RAN network interface 3500 may also include a wired network interface.

The core network server 3000 may communicate with a core network (e.g., backend network, backbone network, Data Network, etc.) of the wireless communication network via a core network interface 3400. The core network interface 3400 may be a wired and/or wireless network interface and may enable the core network server 3000 to communicate and/or transmit data to and from to network devices on the backend network, such as a core network gateway (not shown), a Data Network (not shown), such as the Internet, telephone networks, VoIP networks, etc.

While FIG. 3 depicts an example embodiment of a core network server 3000, the core network server is not limited thereto, and may include additional and/or alternative architectures that may be suitable for the purposes demonstrated.

Figure 4A:
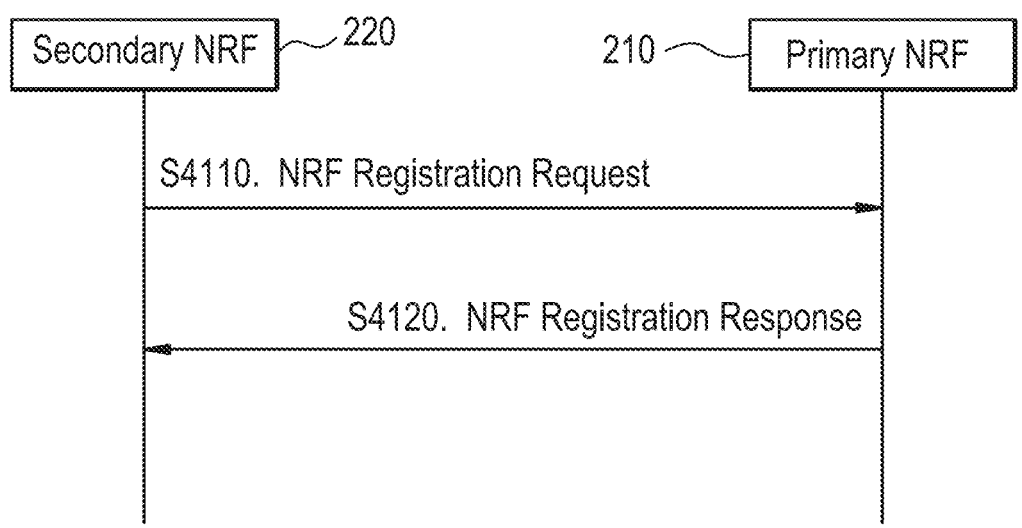
FIGS. 4A to 4C illustrate transmission flow diagrams between a secondary NRF device and a primary NRF device according to some example embodiments.
Figure 4B:
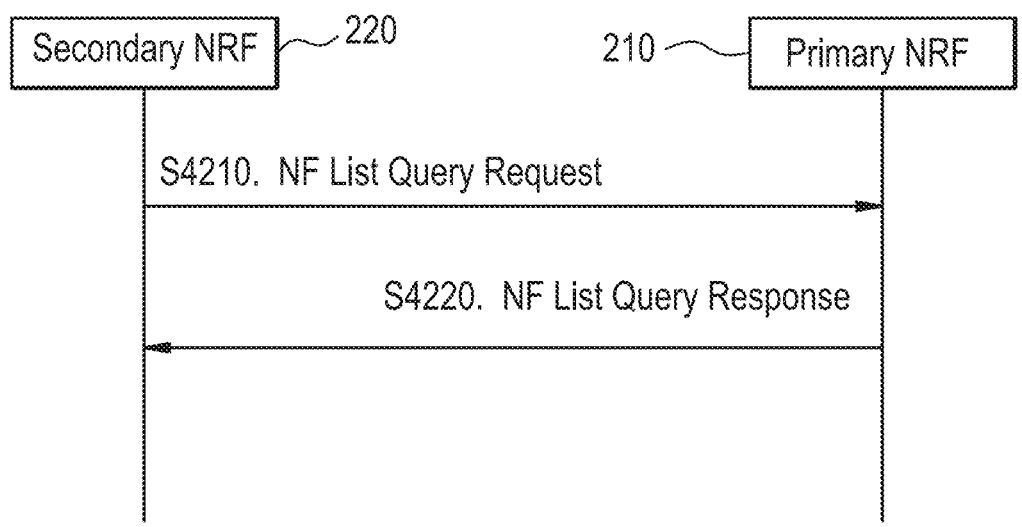
Figure 4C:
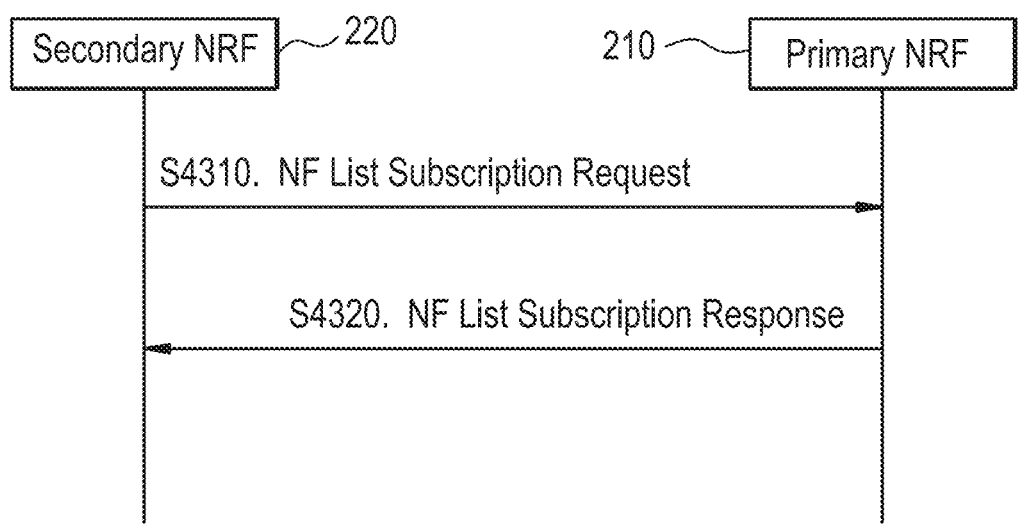

FIGS. 4A to 4C illustrate transmission flow diagrams between a secondary NRF device and a primary NRF device according to some example embodiments.

Referring now to FIG. 4A, a secondary NRF device, such as NRF device 220 may transmit a registration request to a primary NRF device, such as NRF device 210, of a NRF cluster 200, but the example embodiments are not limited thereto. For example, the secondary NRF device 220 may register with the primary NRF device 210 upon first joining the NRF cluster 200, e.g., upon initialization, etc., and/or when the secondary NRF device 220 rejoins the NRF cluster 200 after going offline (e.g., shutdown, reboot, etc.) and/or being unavailable (e.g., network connection interruption, etc.).

In operation S4110, the secondary NRF device 220 may transmit a NRF registration request to the primary NRF device 210. According to at least one example embodiment, the NRF registration request may be a "PUT" command, but is not limited thereto. The NRF registration request may include a unique identifier for the secondary NRF device 220, profile information of the secondary NRF device 220, and/or the network configuration information (e.g., network address information, IP address information, etc.) of the secondary NRF device 220, etc., but is not limited thereto. For example, the profile information may include information related to allowed NF types accepted by the secondary NRF device 220, PLMNs allowed to connect to the secondary NRF device 220, network slice selection assistance information (NSSAIS) allowed for the secondary NRF device 220, the priority information of the secondary NRF device 220, the dynamic load information of the secondary NRF device 220, the locality of the secondary NRF device 220, a heartbeat timer setting (e.g., amount of time expected between 2 consecutive heart-beat messages from an NF instance to the NRF, etc.) of the secondary NRF device 220, etc., but the example embodiments are not limited thereto. The primary NRF device 210 may create a new record (e.g., a new NRF device profile, etc.) for the secondary NRF device 220, and/or may update an existing record and/or an existing NRF device profile if the secondary NRF device 220 had registered with the primary NRF device 210. In operation S4120, the primary NRF device 210 may transmit a NRF registration response message to the secondary NRF device 220. Additionally, according to at least one example embodiment, the NRF registration response message may also be sent to the other secondary NRF devices of the NRF cluster 200, if any, such as NRF device 230, to enable the secondary NRF devices to update and/or synchronize their records in the event the primary NRF device 210 goes offline and/or is unavailable, and the secondary NRF device is promoted to be the primary NRF device.

Referring now to FIG. 4B, FIG. 4B illustrates a secondary NRF device 220 requesting a list of all of the NF devices registered with the primary NRF device 210 according to at least one example embodiment.

In operation S4210, the secondary NRF device 220 transmits a NF list query request to the primary NRF device 210. According to at least one example embodiment, the NF list query request may be a "GET" command, but is not limited thereto. In operation S4220, the primary NRF device 210 may transmit the list of NF devices registered with the primary NRF device 210. The list of NF devices may be updated and/or kept current by the primary NRF device 210 based on heartbeat messages sent by the primary NRF device 210 to the individual NF devices to determine whether they are available or unavailable. The secondary NRF device 220 may then update its records to include all of the currently registered NF devices and/or update the records of NF devices that are no longer available, etc. According to some example embodiments, the secondary NRF device 220 may periodically transmit the NF list query request to the primary NRF device 210 in order to maintain a current and/or up-to-date list of registered NF devices, etc.

Referring now to FIG. 4C, FIG. 4C illustrates a secondary NRF device 220 subscribing to updates from the primary NRF device 210 according to at least one example embodiment.

In operation S4310, the secondary device 220 may transmit a NF list subscription request to the primary NRF device 210. The NF list subscription request allows the secondary device 220 to subscribe to any additions, changes, modifications, updates, etc., to the NF records maintained by the primary NRF device 210. The NF list subscription request may be a "POST" command, but is not limited thereto. The primary NRF device 210 then updates its records to indicate that the secondary NRF device 220 is now subscribed to the NF registration list maintained by the primary NRF device 210. In operation S4320, the primary NRF device 210 pushes updates of the NF registration list to the secondary NRF devices subscribed to the NF registration list, such as secondary NRF device 220, in order to synchronize the NF records of the NRF devices of the NRF cluster 200.

Further, according to some example embodiments, individual NF devices may also subscribe to the NF registration list maintained by the primary NRF device 210. For example, a NF device 310 may transmit a NF list subscription request directly to the primary NRF device 210, if the NF device 310 has been assigned to the primary NRF device 210 via the ordered list of the NRF cluster 200 obtained from the DNS server 600, etc., or the NF device 310 may transmit the NF list subscription request to the secondary NRF device, e.g., secondary NRF device 220, that the NF device 310 to which it is assigned. In the latter scenario, the secondary NRF device 220 then forwards the NF device's NF list subscription request to the primary NRF device 210, and the secondary NRF device 220 then forwards the primary NRF device 210's NF registration list update message to the subscribing NF device.

Figure 5A:
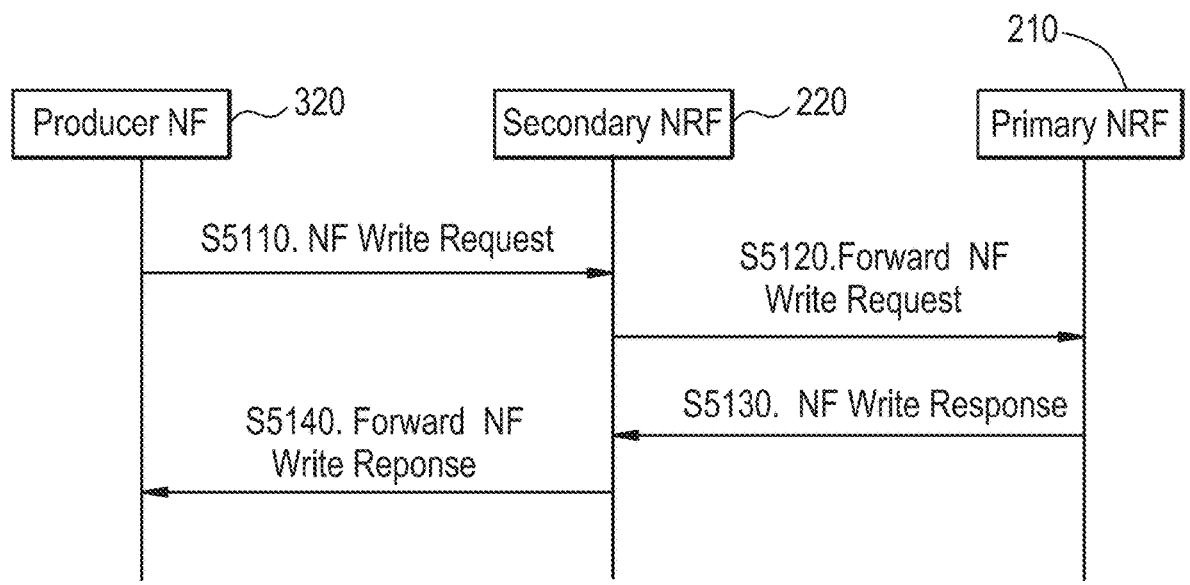
FIG. 5A to 5B illustrate transmission flow diagrams between a NF device and at least one NRF device according to some example embodiments.
Figure 5B:
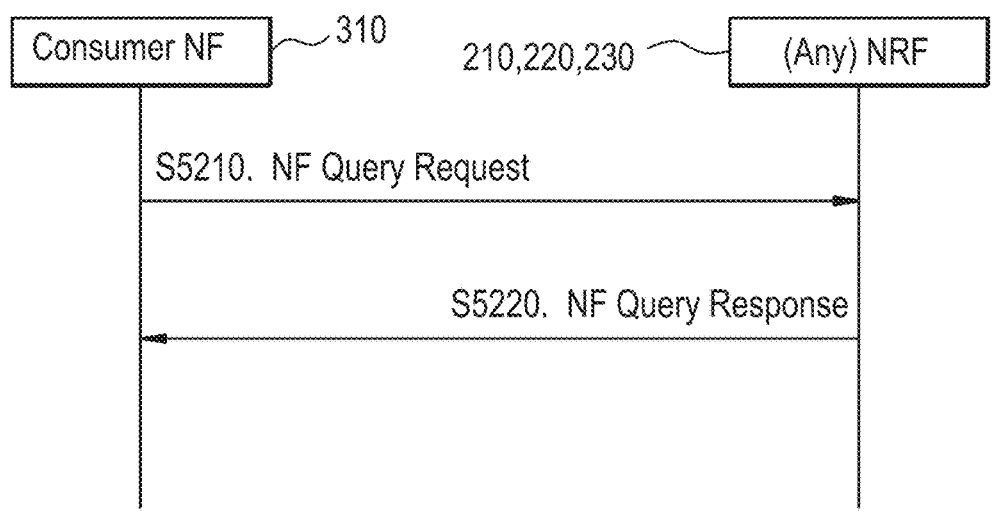

FIGS. 5A to 5B illustrate transmission flow diagrams between a NF device and at least one NRF device according to some example embodiments.

Referring now to FIG. 5A, a producer NF device, such as NF device 320, may transmit a NF write request to at least one NRF device of the NRF cluster 200, such as secondary NRF device 220, however the example embodiments are not limited thereto. The NF write request may be transmitted by the producer NF device 320 when the producer NF device desires to register with the NRF cluster 200 via the primary NRF device 210, such as when the producer NF device 320 initializes and/or joins the PLMN, and/or when the producer NF device desires to modify, change, and/or update the NF profile associated with the producer NF device 320, such as when the producer NF device 320 rejoins the NRF cluster 200 after having been offline and/or unavailable, etc.

In operation S5110, the producer NF device 320 may transmit the NF write request to a NRF device, e.g., secondary NRF device 220, of the NRF cluster 200. According to at least one example embodiment, the NF write request message may be a "PUT" command, but is not limited thereto. In operation S5120, the secondary NRF device 220 may forward the NF write request message to the primary NRF device 210. According to some example embodiments, the NF write request message may be similar to the NRF registration request message and may include a unique identifier for the producer NF device 320, profile information of the producer NF device 320, and/or the network configuration information (e.g., network address information, IP address information, etc.) of the producer NF device 320, etc., but is not limited thereto. For example, the NF profile information may include information related to allowed NF types accepted by the producer NF device 320, PLMNs allowed to connect to the producer NF device 320, network slice selection assistance information (NSSAIS) allowed for the producer NF device 320, the priority information of the s producer NF device 320, the dynamic load information of the producer NF device 320, the locality of the producer NF device 320, a heartbeat timer setting (e.g., amount of time expected between 2 consecutive heart-beat messages from an NF instance to the NRF, etc.) of the producer NF device 320, etc., but the example embodiments are not limited thereto. The primary NRF device 210 may then create a new NF profile based on the information included in the NF write request message, or may update an existing NF profile associated with the producer NF device 320, etc.

In operation S5130, the primary NRF device 210 may then transmit a NF write response message to the secondary NRF device 220. The secondary NRF device 220 may then update its own NF registration list with the information included in the NF write response message, and then forward the NF write response message to the producer NF device 320. Additionally, according to some example embodiments, the primary NRF device 210 may also push an updated NF registration list to the secondary NRF devices and/or other NF devices that have subscribed to the NF registration list, etc., reflecting the change to the NF registration list maintained by the primary NRF device 210.

Moreover, according to at least one other example embodiment, the producer NF device 320 may transmit the NF write request directly to the primary NRF device 210 and omit the secondary NRF device 220, for example, when the producer NF device 320 has been assigned to the primary NRF device 210, etc.

Referring now to FIG. 5B, FIG. 5B illustrates a consumer NF device, such as NF device 310, etc., querying the NRF cluster 200 for information regarding producer NF devices registered with the NRF cluster 200. For example, the consumer NF device 310 may request specific information from the primary NRF device 210 in order to determine the appropriate producer NF device of the PLMN that provides a network service desired by the consumer NF device 310, etc., but the example embodiments are not limited thereto. Additionally, according to other example embodiments, the producer NF devices may also transmit NF query messages to a NRF device of the NRF cluster 200, etc.

In operation S5210, the consumer NF device 310 may transmit a NF query request message to at least one NRF device of the NRF cluster 200, such as primary NRF device 210, or secondary NRF devices 220, 230, etc. For example, the consumer NF device 310 may transmit the NF query request message to the NRF device to which it has been assigned through the ordered list provided by the DNS server 600, but is not limited thereto. The NF query request message may include a request for information regarding a producer NF device which may satisfy the consumer NF device's criteria, and may include information such as NF type information (e.g., the type of NF device the requesting NF device desires, etc.), NF device load information, NF device locality information, NF device priority information, etc. Assuming the consumer NF device 310 was assigned to secondary NRF device 220, the secondary NRF device 220 searches its database for the NF records (e.g., NF profile information, etc.) that satisfy the NF query request of the consumer NF device 310, and in operation S5220, transmits the results of the NF query to the consumer NF device 310 in a NF query response message, thereby providing load-balancing functionality to the NRF cluster 200. The consumer NF device 310 may then analyze the contents of the NF query response message, and then communicate with a producer NF device based on the contents of the NF query response message, etc.

Additionally, according to other example embodiments, the NRF device responding to the consumer NRF device 310 may be the primary NRF device 210, etc.

FIG. 6 is a flowchart illustrating a method for operating a NRF device according to at least one example embodiment. The method of FIG. 6 may apply to either a secondary NRF device or a primary NRF device.

According to at least one example embodiment, in operation S6010, the NRF device may broadcast a NRF query to a NRF cluster 200 of a core network 100. According to some example embodiments, the NRF device may broadcast the NRF query to the NRF cluster 200 upon initialization of the NRF device (e.g., upon boot-up of the NRF device, etc.), upon a received command and/or instruction (e.g., from an administrator, the primary NRF device of the NRF cluster 200, etc.), and/or periodically, etc., but the example embodiments are not limited thereto. According to some example embodiments, the NRF query may include network configuration information associated with the broadcasting NRF device, such as a unique identifier, network address information, IP address information, priority information, uptime information, etc., but the example embodiments are not limited thereto.

In operation S6020, the NRF device may receive NRF query responses from the other NRF devices of the NRF cluster 200, including the network configuration information of each of the other NRF devices. If there are no other NRF devices connected to the NRF cluster 200 (e.g., there are no other NRF devices on the subnet associated with the NRF cluster 200, etc.), then the NRF device will not receive a NRF query response.

In operation S6030, the NRF device may determine the network status of each NRF device of the NRF cluster 200. According to some example embodiments, the NRF device may determine the online/offline status of the NRF devices of the NRF cluster 200, etc. In operation S6035, the NRF device may also determine which NRF device of the NRF cluster is the primary NRF device of the NRF cluster 200 based on the received network configuration information of each of the NRF devices of the NRF cluster 200, the network status information of the NRF devices, and the primary NRF device election rules/criteria of the NRF cluster 200, etc., however the example embodiments are not limited thereto. The election of the primary NRF device was discussed in greater detail in connection with FIG. 2A.

In operation S6040, the NRF device may determine a list of NF devices which have been registered with the NRF cluster 200 from the determined primary NRF device of the NRF cluster 200. For example, the NRF device may transmit a NF list query request to the primary NRF device to receive an immediate list of NF devices registered with the primary NRF device, and/or may transmit a NF list subscription request to the primary NRF device, e.g., subscribe to the primary NRF device's NF list, and receive a NF list update message with the NF list information at the next broadcast time of the primary NRF device, etc., but the example embodiments are not limited thereto.

In operation S6050, the NRF device may receive a NF query request from at least one NF device connected to the NRF cluster 200. For example, the NF query request may include a request for information of registered NF devices which satisfy the NF device's criteria, the criteria including information such as NF type information (e.g., the type of NF device the requesting NF device desires, etc.), NF device load information, NF device locality information, NF device priority information, etc.

In operation S6060, the NRF device may transmit a NF query response to the at least one NF device responsive to the NF query request. For example, the NRF device may determine the results of the NF query based on the NRF device's own records (e.g., the stored NF list information received from the primary NRF device, etc.), or may forward the NF query request to the primary NRF device, receive the NF query response from the primary NRF device, and then forward the NF query response to the requesting NF device, but the example embodiments are not limited thereto.

While FIGS. 4A to 6 illustrate various methods for implementing fault-tolerant multi-NRF network, the example embodiments are not limited thereto, and other methods may be used to implement messages between at least one NF device and a plurality of NRF devices of a NRF cluster.

Various example embodiments are directed towards a wireless network system implementing a fault-tolerant multi-NRF network topology. Accordingly, one or more of the example embodiments provide redundancy and/or failover support for NRF device(s) and/or NF device(s) on the wireless communication network, as well as providing load-balancing functionality for NF requests, thereby improving the network capabilities and uptime for the wireless communication network, as well as decreasing the amount of network resource usage and network traffic experienced by any single NRF device of the wireless communication network.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A network repository function (NRF) device, comprising:
   a memory storing computer readable instructions; and
   at least one processor configured to execute the computer readable instructions to cause the NRF device to,
      broadcast a NRF query to a NRF cluster of a core network, the NRF cluster including a plurality of NRF devices located in a public land mobile network (PLMN), the NRF query including network configuration information of the NRF device,
      receive NRF query responses from each NRF device of the NRF cluster, the NRF query responses including network configuration information of each NRF device of the NRF cluster,
      determine a status of each NRF device of the NRF cluster based on the network configuration information of the plurality of NRF devices, the determining
the status including determining which NRF device
of the plurality of NRF devices is a primary NRF
device of the NRF cluster,
determine a list of network function (NF) devices
registered with the NRF cluster,
receive a NF query request from a first NF device, and
transmit a NF query response to the first NF device, the
NF query response based on the determined list of
NF devices.

2. The NRF device of claim 1, wherein
the NRF device is a secondary NRF device of the NRF
cluster; and
the at least one processor is further configured to cause the
NRF device to,
receive the list of NF devices registered with the NRF
cluster from the primary NRF device, and
transmit the NF query response to the first NF device
based on the received list of NF devices.

3. The NRF device of claim 1, wherein the at least one
processor is further configured to cause the NRF device to:
receive a NF registration request from a second NF
device;
transmit the NF registration request to the primary NRF
device;
receive a NF registration response from the primary NRF
device; and
forward the NF registration response to the second NF
device.

4. The NRF device of claim 1, wherein the at least one
processor is further configured to cause the NRF device to:
receive an updated list of the NF devices registered with
the NRF cluster from the primary NRF device in
response to at least one change in the NF devices
registered with the NRF cluster; and
receive current subscription information from the primary
NRF device, the current subscription information
including a list of the NF devices subscribed to the
primary NRF device.

5. The NRF device of claim 1, wherein the at least one
processor is further configured to cause the NRF device to,
determine a network status of the primary NRF device of
the NRF cluster; and
in response to the network status of the primary NRF
device indicating the primary NRF device is offline,
determine a current primary NRF device from remain-
ing NRF devices of the plurality of NRF devices of
the NRF cluster based on the network configuration
information of the remaining NRF devices, and
receive an updated list of the NF devices registered
with the NRF cluster from the current primary NRF
device.

6. The NRF device of claim 1, wherein
the NRF device is the primary NRF device; and
the at least one processor is further configured to cause the
NRF device to,
receive a second NF registration request from a second
NF device or from at least one secondary NRF
device of the NRF cluster,
update the list of the NF devices registered with the
NRF cluster based on the received second NF reg-
istration request,
transmit a second NF registration response to the
second NF device or to the at least one secondary
NRF device, and
transmit the updated list of the NF devices registered
with the NRF cluster to the at least one secondary
NRF device.

7. The NRF device of claim 1, wherein the at least one
processor is further configured to cause the NRF device to:
broadcast the NRF query request to the NRF cluster to a
subnet of the core network assigned to the NRF cluster;
and
wherein the network configuration information of the
NRF cluster includes at least an IP address of each NRF
device of the NRF cluster.

8. A network function (NF) device comprising:
a memory having computer readable instructions stored
thereon; and
at least one processor configured to execute the computer
readable instructions to cause the NF device to,
transmit a network address query to a domain name
search (DNS) server related to a network repository
function (NRF) cluster located in a public land
mobile network (PLMN), the NRF cluster including
a plurality of NRF devices, the plurality of NRF
devices including a primary NRF device and at least
one secondary NRF device,
receive a DNS response from the DNS server, the DNS
response including a list of network address infor-
mation for each NRF device of the NRF cluster,
transmit a NF registration request to at least one NRF
device of the NRF cluster based on the list of
network address information for the plurality of NRF
devices of the NRF cluster, and
receive a NF registration response from the at least one
NRF device of the NRF cluster.

9. The NF device of claim 8, wherein the at least one
processor is further configured to cause the NF device to:
transmit a NF query request to the at least one NRF device
of the NRF cluster; and
receive a NF query response from the at least one NRF
device of the NRF cluster.

10. The NF device of claim 8, wherein
the NF device is a consumer NF device; and
the at least one processor is further configured to cause the
NF device to communicate with at least one first
producer NF device based on a received NF query
response from the at least one NRF device of the NRF
cluster.

11. The NF device of claim 8, wherein the at least one
processor is further configured to cause the NF device to:
determine whether at least one first producer NF device is
offline; and
in response to the at least one first producer NF device
being offline,
transmit a second NF query request to the at least one
NRF device of the NRF cluster,
receive a second NF query response from the at least
one NRF device of the NRF cluster, and
communicate with at least one second producer NF
device based on the received second NF query
response.

12. The NF device of claim 8, wherein the at least one
processor is further configured to cause the NF device to:
transmit the NF registration request to a first NRF device
of the NRF cluster corresponding to a first entry of the
list of network address information for the NRF cluster,
the list of network address information being a load-
balanced list of network address information; and
receive the NF registration response from the first NRF
device of the NRF cluster.

13. The NF device of claim 8, wherein the at least one processor is further configured to cause the NF device to:
    determine whether a first NRF device of the NRF cluster is offline; and
    in response to the first NRF device being offline,
        transmit a third NF query request to a second NRF device of the NRF cluster corresponding to a second entry of the list of network address information for the NRF cluster, and
        receive a third NF query response from the second NRF device.

14. A method of operating a network repository function (NRF) device, the method comprising:
    broadcasting, using at least one processor, a NRF query to a NRF cluster of a core network, the NRF cluster including a plurality of NRF devices located in a public land mobile network (PLMN), the NRF query including network configuration information of the NRF device;
    receiving, using the at least one processor, NRF query responses from each NRF device of the NRF cluster, the NRF query responses including network configuration information of the plurality of NRF devices;
    determining, using the at least one processor, a status of each NRF device of the NRF cluster based on the network configuration information of the plurality of NRF devices, the determining the status including determining which NRF device of the plurality of NRF devices is a primary NRF device of the NRF cluster;
    determining, using the at least one processor, a list of network function (NF) devices registered with the NRF cluster;
    receiving, using the at least one processor, a NR query request from a first NF device; and
    transmitting, using the at least one processor, a NR query response to the first NF device, the NR query response based on the determined list of NF devices.

15. The method of claim 14, wherein the NRF device is a secondary NRF device of the NRF cluster; and
    the method further comprises,
        receiving, using the at least one processor, the list of NF devices registered with the NRF cluster from the primary NRF device, and
        transmitting, using the at least one processor, the NR query response to the first NF device based on the received list of NF devices.

16. The method of claim 14, further comprising:
    receiving, using the at least one processor, a NF registration request from a second NF device;
    transmitting, using the at least one processor, the NF registration request to the primary NRF device;
    receiving, using the at least one processor, a NF registration response from the primary NRF device; and
    forwarding, using the at least one processor, the NF registration response to the second NF device.

17. The method of claim 14, further comprising:
    receiving, using the at least one processor, an updated list of the NF devices registered with the NRF cluster from the primary NRF device in response to at least one change in the NF devices registered with the NRF cluster; and
    receiving, using the at least one processor, current subscription information from the primary NRF device, the current subscription information including a list of the NF devices subscribed to the primary NRF device.

18. The method of claim 14, further comprising:
    determining, using the least one processor, a network status of the primary NRF device of the NRF cluster; and
    in response to the network status of the primary NRF device indicating the primary NRF device is offline,
        determining a current primary NRF device from remaining NRF devices of the plurality of NRF devices of the NRF cluster based on the network configuration information of the remaining NRF devices, and
        receiving an updated list of the NF devices registered with the NRF cluster from the current primary NRF device.

19. The method of claim 14, wherein
    the NRF device is the primary NRF device; and
    the method further comprises,
        receiving, using the at least one processor, a second NF registration request from a second NF device or from at least one secondary NRF device of the NRF cluster,
        updating, using the at least one processor, the list of the NF devices registered with the NRF cluster based on the received second NF registration request,
        transmitting, using the at least one processor, a second NF registration response to the second NF device or to the at least one secondary NRF device, and
        transmitting, using the at least one processor, the updated list of the NF devices registered with the NRF cluster to the at least one secondary NRF device.

20. The method of claim 14, wherein
    the broadcasting the NRF query request to the NRF cluster further includes transmitting the broadcast message to a subnet of the core network assigned to the NRF cluster; and
    the network configuration information includes at least an IP address of each NRF device of the NRF cluster.

* * * * *